United States Patent
Liu et al.

(10) Patent No.: US 7,490,413 B2
(45) Date of Patent: Feb. 17, 2009

(54) CONTOUR MEASURING DEVICE WITH ERROR CORRECTING UNIT

(75) Inventors: Qing Liu, Shenzhen (CN); Jun-Qi Li, Shenzhen (CN); Takeo Nakagawa, Tokyo (JP)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW); Fine Tech Corporation, Tokyo (JP)

( * ) Notice: Subject to any disclaimer, the term of this patent is extended or adjusted under 35 U.S.C. 154(b) by 18 days.

(21) Appl. No.: 11/843,664

(22) Filed: Aug. 23, 2007

(65) Prior Publication Data

US 2008/0072442 A1 Mar. 27, 2008

(30) Foreign Application Priority Data

Sep. 22, 2006 (JP) ............................. 2006-258042

(51) Int. Cl.
*G01B 5/20* (2006.01)
*G01B 11/24* (2006.01)
(52) U.S. Cl. .............................. 33/552; 33/1 M; 33/546
(58) Field of Classification Search .................. 33/1 M, 33/545, 546, 547, 549, 551, 552, 553, 554
See application file for complete search history.

(56) References Cited

U.S. PATENT DOCUMENTS

| 1,856,944 | A | * | 5/1932 | Blomstrom | 33/545 |
| 2,880,516 | A | * | 4/1959 | Tandler | 33/552 |
| 4,122,608 | A | * | 10/1978 | Hopf | 33/549 |
| 5,333,386 | A | * | 8/1994 | Breyer et al. | 33/1 M |
| 5,426,861 | A | * | 6/1995 | Shelton | 33/545 |
| 5,485,406 | A | * | 1/1996 | Wada et al. | 33/551 |
| 2006/0037208 | A1 | * | 2/2006 | McMurtry | 33/554 |
| 2007/0051004 | A1 | * | 3/2007 | Liu | 33/552 |

* cited by examiner

*Primary Examiner*—G. Bradley Bennett
(74) *Attorney, Agent, or Firm*—Frank R. Niranjan

(57) ABSTRACT

An exemplary contour measuring device (100) includes a pair of guide rails (13), a movable fixture (14), a first probe (15), a second probe (16), and an error correcting unit (17). The movable fixture is movably disposed on the guide rails. The first probe is configured for measuring an object along a contour measuring direction and obtaining a first measured contour value from the object to be measured. The second probe is configured for measuring a standard object whose contour is known along the contour measuring direction and obtaining a second measured contour value from the standard object. The error correcting unit is configured for compensating the first measured contour value according to the second measured contour value.

14 Claims, 13 Drawing Sheets

CONTOUR MEASURING DEVICE WITH ERROR CORRECTING UNIT

BACKGROUND OF THE INVENTION

1. Field of the Invention

The present invention relates, generally, to contour measuring devices, and particularly to a contour measuring device with an error correcting unit for automatically and accurately compensate for errors in measurements.

2. Discussion of the Related Art

In the manufacturing of precision objects such as optical components (lenses) and other industrial components (ball bearings) the need exist to determine whether manufacturing errors are within acceptable tolerance. Such manufacturing errors may include the differences between the design dimensions and the manufactured dimensions of the object. Measured dimensions of the manufactured object are usually regarded as the actual dimensions. Precision measuring devices are used to measure the manufactured objects, and the more precise the measuring device, the better. Precision measuring devices, are of two types: contact-type precision measuring device and contactless-type precision measuring device. The contact-type precision measuring device has a probe that touches and traces the contour of the object. The contactless-type precision measuring has an optical probe for emitting light towards the objects.

As indicated above, both contact-type contour measuring device and contactless-type contour measuring device are commonly used to measure the contours of precision objects. Referring to FIG. 13, a typical contour measuring device 30 includes a horizontal platform 31, a pair of guide rails 32 fixed on the horizontal platform 31, and a movable fixture 33 disposed on the guide rails 32. The movable fixture 33 includes a probe 331. The probe 331 can be a touch trigger probe or an optical probe. If the probe 331 is a touch trigger probe, the probe 331 will touch an object 34 during contour measurement of the object 34. If the probe 331 is an optical probe, the probe 331 will emit light towards the object 34 and the light reflected off the object 34 could be captured and processed in order to obtain the contour measurement of the object 34.

Inherently, the contour measuring device 30 exhibits errors such as linear errors (linear errors along an X-Y plane, and an X-Z plane) of the guide rails 32, and motion errors (rotation errors along an X-axis direction, a Y-axis direction, and a Z-axis direction) of the movable fixture 33. Therefore, the measured contour value of the object 34 is subjected to errors during the measuring process, thereby decreasing the accuracy of the measured contour values. However, the linear errors of the guide rails 32 can be determined in advance, and the measured contour value can be compensated according to the linear errors previously determined. However, the linear errors determined in advance are generally different in each measuring processes, thus the measured contour value may not be compensated accurately in each measuring process.

Therefore, a contour measuring device which can automatically and more accurately compensate measured contour value is desired.

SUMMARY

A contour measuring device includes a pair of guide rails, a movable fixture, a first probe, a second probe, and an error correcting unit. The movable fixture is movably disposed on the guide rails. The first probe is configured for measuring an object along a contour measuring direction and obtaining a first measured contour value from the object to be measured. The second probe is configured for measuring a standard object whose contour is known along the contour measuring direction and obtaining a second measured contour value from the standard object. The error correcting unit is configured for compensating the first measured contour value according to the second measured contour value.

Other advantages and novel features will become more apparent from the following detailed description when taken in conjunction with the accompanying drawings.

BRIEF DESCRIPTION OF THE DRAWINGS

The components in the drawings are not necessarily drawn to measuring scale, the emphasis instead being placed upon clearly illustrating the principles of the contour measuring device. Moreover, in the drawings, like reference numerals designate corresponding parts throughout the several views.

DETAILED DESCRIPTION OF THE EMBODIMENTS

Reference will now be made to the drawings to describe preferred embodiments of the present contour measuring device, in detail.

Figure 1:
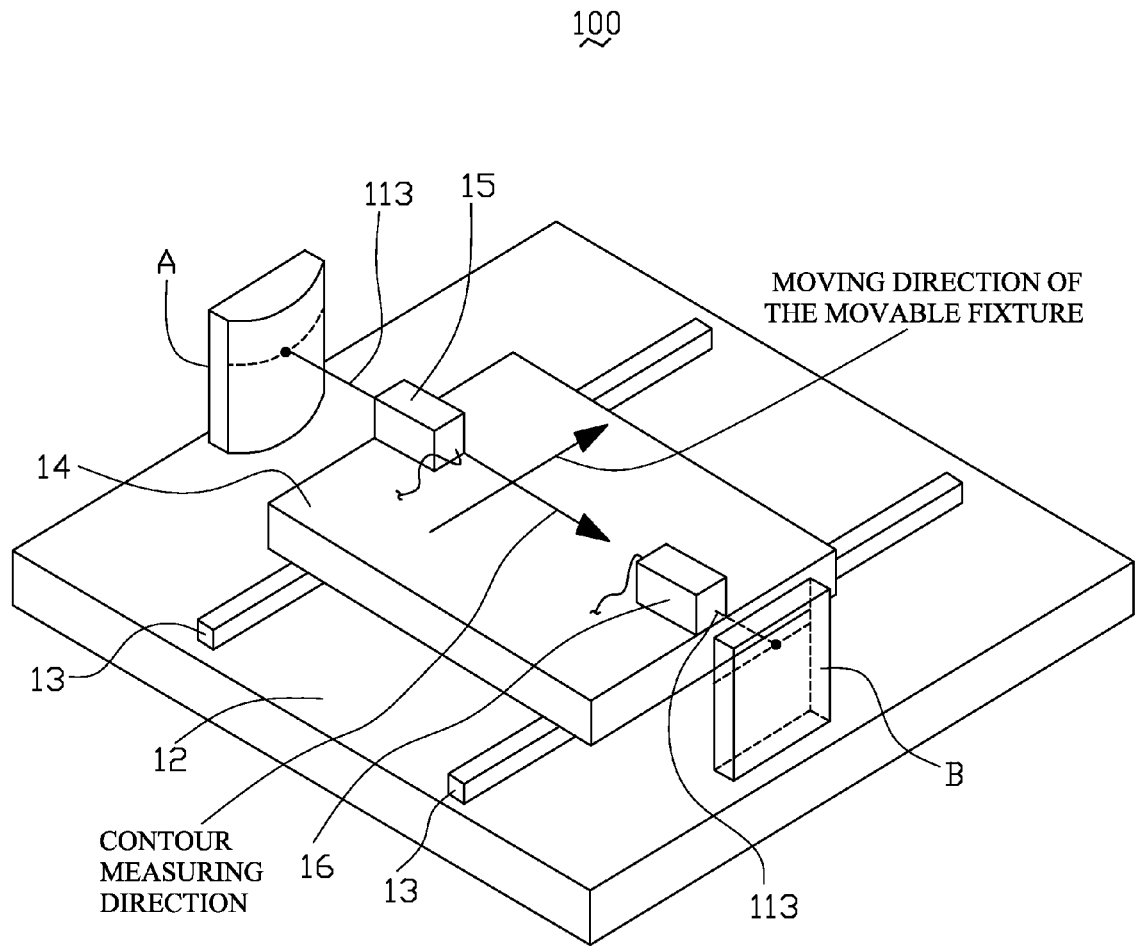
FIG. 1 is a schematic, isometric view of a contour measuring device in a state according to a first embodiment of the present invention.
Figure 2:
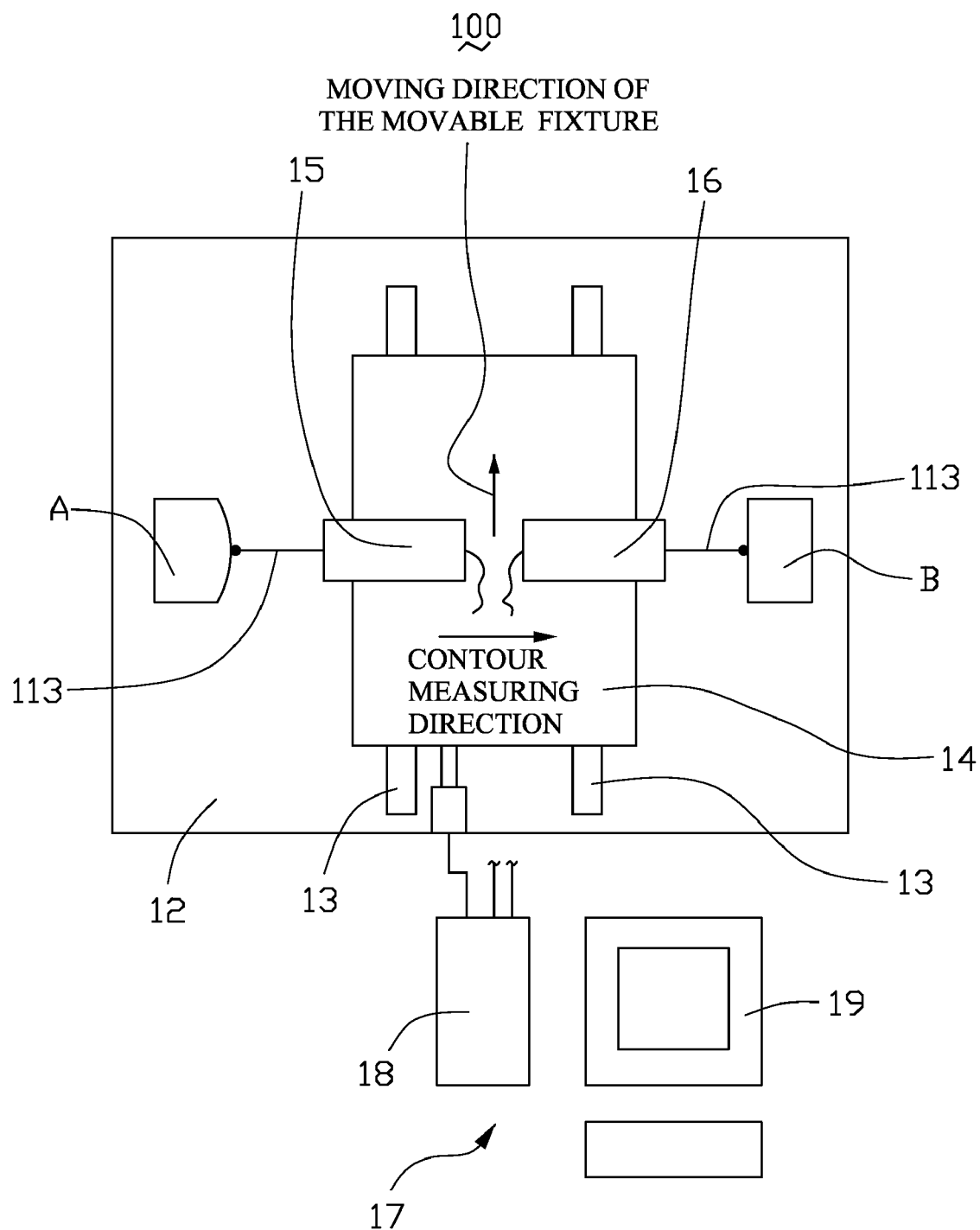
FIG. 2 is a schematic, top plan view of the contour measuring device shown in FIG. 1.

Referring to FIG. 1 and FIG. 2, the drawings show a contour measuring device 100 of a first embodiment of the present invention. The contour measuring device 100 includes a horizontal platform 12, a pair of guide rails 13, a movable fixture 14, a first probe 15, a second probe 16, and an error correcting unit 17. The guide rails 13 are disposed on the horizontal platform 12, spaced apart and parallel to each other. The movable fixture 14 is disposed on the guide rails 13. The movable fixture 14 can further be driven by a driving structure (not shown) to move along the guide rails 13. The driving structure can either be a manual driving structure or an automatic driving structure.

The first probe 15 and the second probe 16 are disposed on the movable fixture 14. The first probe 15 and the second probe 16 are coaxially aligned on a line along a contour measuring direction. The first probe and the second probe are disposed on the horizontal platform at opposite end of the movable fixture. The first probe 15 moves with the movable fixture 14 so as to obtain a measured contour value of an object A to be measured. The object A is disposed on the horizontal platform 12 adjacent to one side of the movable fixture 14. The second probe 16 also moves with the movable fixture 14 and the second probe 16 measures the contour of a standard object B simultaneously with the measurement of object A by the first probe 15. The standard object B is an object whose contour is known. This standard object B is positioned on the horizontal platform 12, next to the movable fixture 14 but on the side of the movable fixture 14 that is across from first probe 15. As such, any linear or motion errors, of the movable fixture 14, can be determined by comparing the known contour value of the standard object B with the measured contour value of the standard object B. Thus linear and motion errors as determined by the second probe 16 can be applied to, and compensate for, errors in the first probe 15 measurement of the contour of the object A. In the described embodiment, the first probe 15 and the second probe 16 are both touch trigger probes, thus the first probe 15 and the second probe 16 contact the object A and the standard object B respectively.

Figure 3:
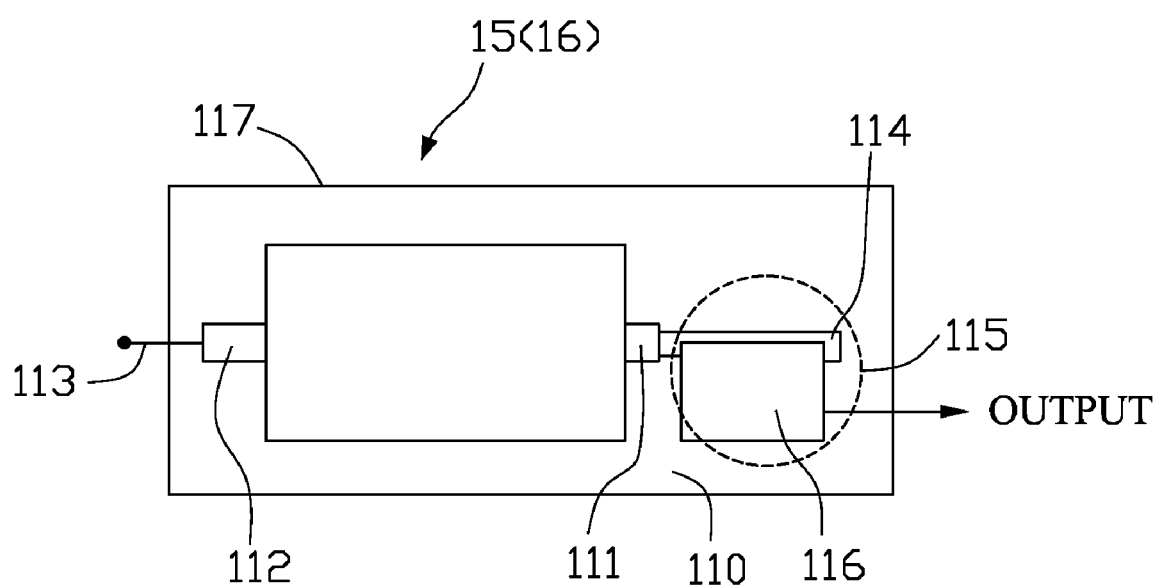
FIG. 3 is a schematic view of a probe of the contour measuring device shown in FIG. 1.

Referring to FIG. 3, the first probe 15 and the second probe 16 each include a mounting base 110, a block guide rail 111, a shaft 112, a contact tip 113, a measuring scale 114, a displacement sensor 115, a pick-up head 116, and a cover 117. The shaft 112 is disposed on the block guide rail 111. The contact tip 113 is disposed at an end of the shaft 112 and the measuring scale 114 is disposed at another end of the shaft 112. The measuring scale 114 is configured for measuring displacements of the contact tip 113. The displacement sensor 115 is disposed on the mounting base 110 for detecting the displacements measured by the measuring scale 114 and obtaining the measured contour value. The pick-up head 116 is configured for reading the measured contour value from the displacement sensor 115. The cover 117 is disposed on the mounting base 110 for covering the block guide rail 111, the shaft 112, part of the contact tip 113, the measuring scale 114, the displacement sensor 115, and the pick-up head 116. The cover 117 further defines a through hole (not shown) at an end for the contact tip 113 to slidably protrude out of the cover 117.

Referring again to FIG. 2, the error correcting unit 17 is disposed on or adjacent to the horizontal platform 12. The error correcting unit 17 includes a processor 18 and a memory chip 19. The processor 18 is connected to a timer (not labeled) or a logic processing circuit (not shown). The memory chip 19 is connected to an output port (not shown) of the processor 18, and is configured with a function for displaying the measured contour values. The processor 18 is connected to the first probe 15 and the second probe 16 for receiving the measured contour values of objects A and B. The processor 18 compensates the measured contour value of object A by applying an offset value as determined by second probe 16, thus compensating for measured errors such as linear errors of the guide rails 13 and motion errors of the movable fixture 14.

Figure 4:
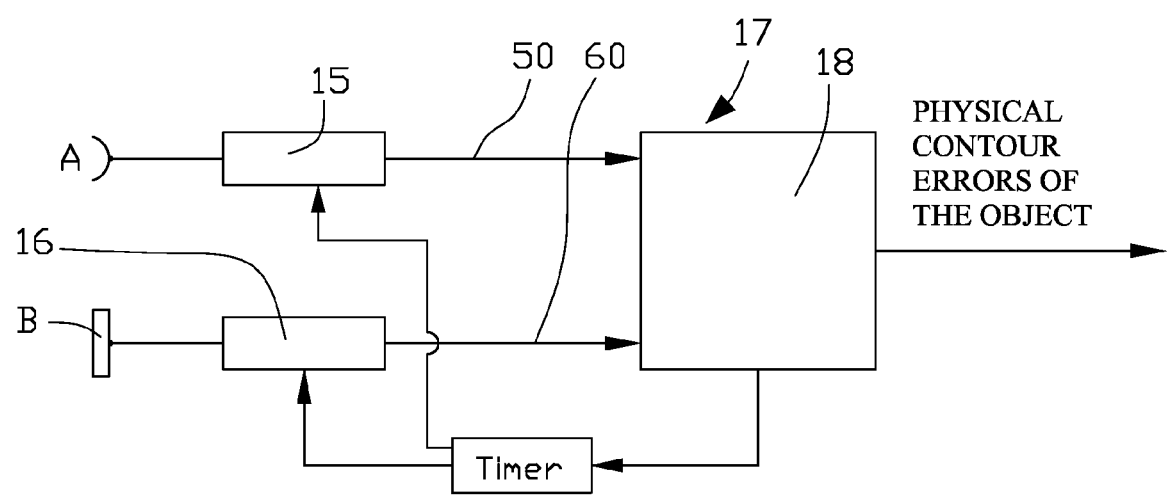
FIG. 4 is a diagram of a measuring process of an error correcting unit of the contour measuring device shown in FIG. 1.

Referring to FIG. 1 and FIG. 4, the contact tip 113 of the first probe 15 is in contact with a contour (not labeled) of the object A and the contact tip 113 of the second probe 16 is in contact with a reference contour (not labeled) of the standard object B. When the movable fixture 14 is moved, the contact tip 113 of the first probe 15 rubs against the contour of the object A, thus driving the shaft 112 (see FIG. 3) to slide on the block guide rail 111 according to the contour of the object A. As a result, the measuring scale 114 at the other end of the shaft 112 (see FIG. 3) will be displaced. The displacement sensor 115 of the first probe 15 obtains a first measured contour value 50 by detecting the displacement of the measuring scale 114. At the same time, the contact tip 113 of the second probe 16 rubs against the reference contour of the standard object B, thus driving the shaft 112 to slide on the block guide rail 111 according to the reference contour of the standard object B. Linear errors of the guide rails 13 and motion errors of the movable fixture 14 that happens to the first probe 15 also happens to the second probe 16. As a result, the measuring scale 114 at the other end of the shaft 112 (see FIG. 3), of the second probe 16, will also be displaced. The displacement sensor 115 of the second probe 16 obtains a second measured contour value 60.

The first measured contour value 50 is erroneous with contour errors of the object A, linear errors of the guide rails 13, and motion errors of the movable fixture 14. The second measured contour value 60 includes contour errors (it is a known quantity) of the standard object B, the linear errors of the guide rails 13, and the motion errors of the movable fixture 14. The pick-up head 116 reads the first measured contour value 50 and the second measured contour value 60, and transmits them to the error correcting unit 17. The error correcting unit 17 processes the first measured contour value 50 and the second measured contour value 60 in the following steps. In a first step, because the contour errors of the standard object B is a known quantity, thus if the contour errors of the standard object B is eliminated from the second measured contour value 60, the linear errors of the guide rails 13 and the motion errors of the movable fixture 14 are obtained. In a second step, the linear errors of the guide rails 13 and the motion errors of the movable fixture 14 are then subtracted from the first measured contour value 50.

Figure 5:
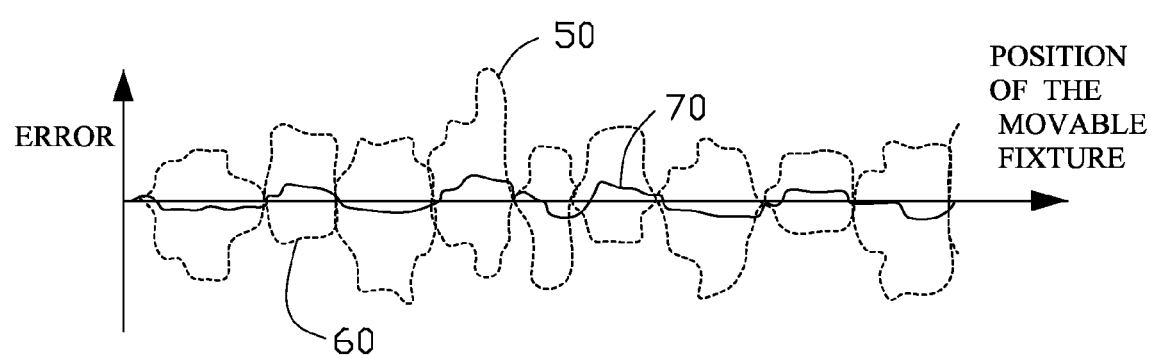
FIG. 5 is a graph of measured contour value obtained by the contour measuring device shown in FIG. 1.

Referring to FIG. 5, when the linear errors of the guide rails 13 and the motion errors of the movable fixture 14 are subtracted from the first measured contour value 50, a compensated contour value 70 of the object A is obtained. Therefore, the compensated contour value 70 is almost free from the linear errors of the guide rails 13 and the motion errors of the movable fixture 14 and is almost equal to true contour errors of the object A. The compensated contour value 70 is transmitted to the memory chip 19 by the processor 18. Since the above two steps are both realized in the processor 18, the memory chip 19 can register the compensated contour value 70 output by the processor 18 one by one in real time.

Figure 6:
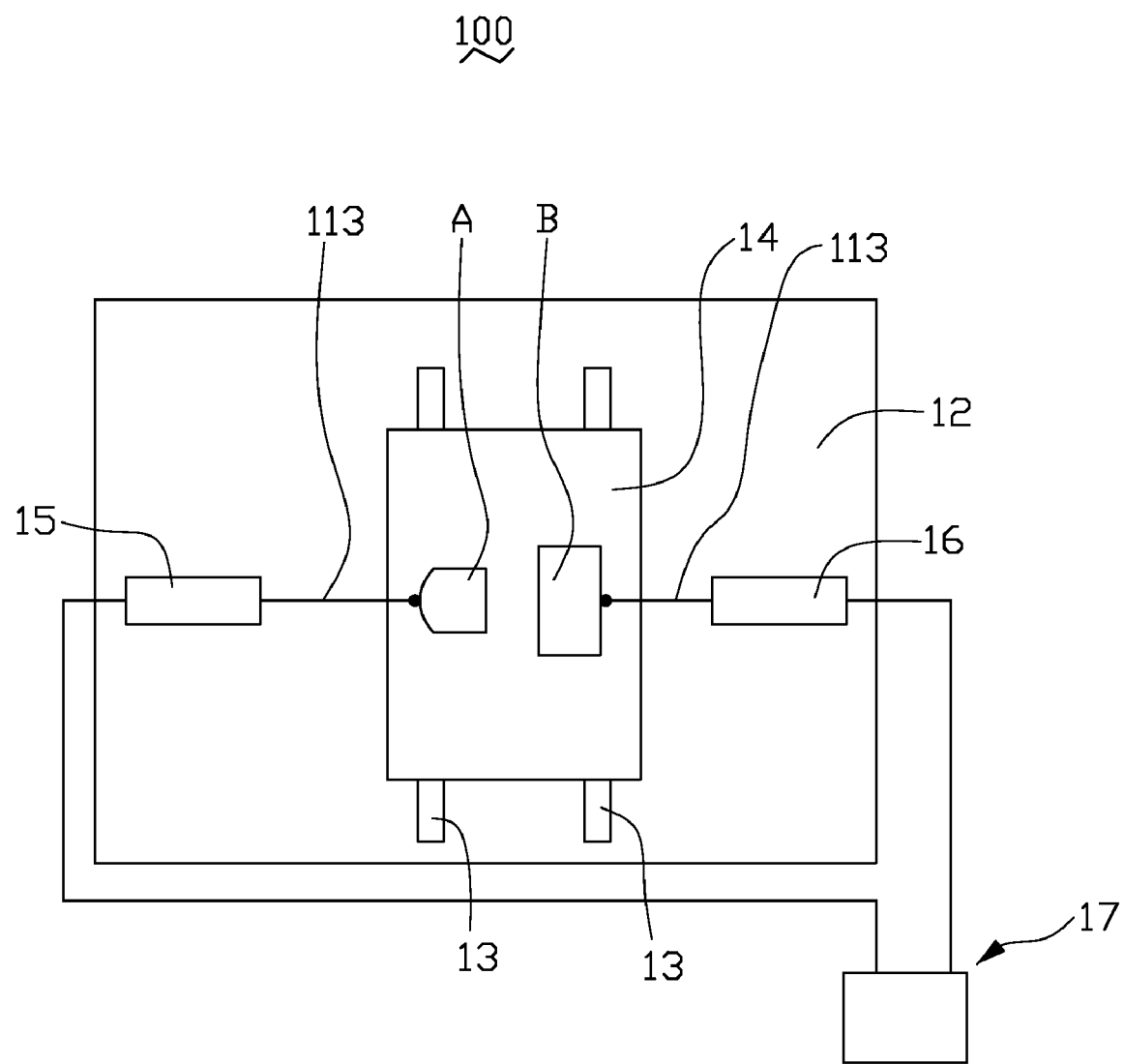
FIG. 6 is a top plan, schematic view of a contour measuring device in another state according to the first embodiment of the present invention.

Referring to FIG. 6, in another state of the first embodiment, the contour measuring device 100 shown in FIG. 6 is similar in principle to that shown FIG. 1. However, the first probe 15 and the second probe 16 are disposed at two opposite sides of the horizontal platform 12, and the first probe 15 and the second probe 16 are both adjacent to the movable fixture 14. The first probe 15 and the second probe 16 are coaxially aligned along the contour measuring direction. The object A is disposed at a side of the movable fixture 14 and the standard object B is disposed at the other side of the movable fixture 14. The object A moves together with the movable fixture 14 so that the first probe 15 can obtain a measured contour value of the standard object A. The standard object B also moves together with the movable fixture 14 and the second probe 16 measures the contour of a standard object B simultaneously with the measurement of object A by the first probe 15.

Referring to FIGS. 7 through 10, a contour measuring device 200 according to a second embodiment is shown. The contour measuring device 200 is similar in principle to the contour measuring device 100 described above. The contour measuring device 200 includes a horizontal platform 22, a pair of guide rails 23, a movable fixture 24, a first probe 25, and a second probe 26. However, the first probe 25 and the second probe 26 are disposed parallel to and offset each other. The various configurations are explained below.

Figure 7:
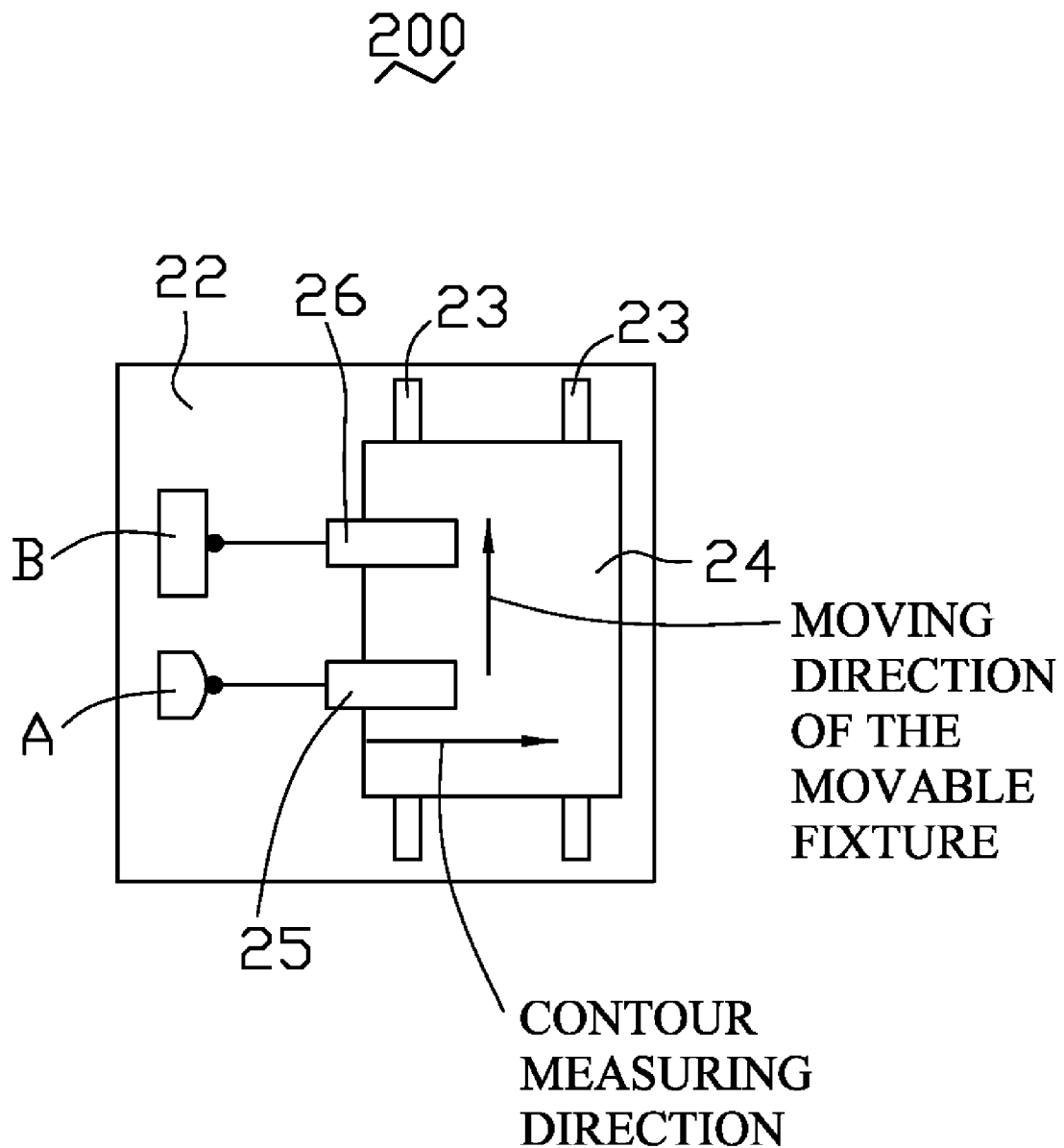
FIG. 7 is a schematic, top plan view of a contour measuring device in a first state according to a second embodiment of the present invention.

Referring to FIG. 7, in a first state of the second embodiment, the first probe 25 and the second probe 26 are disposed on the movable fixture 24 and are aligned parallel to each other. The first probe 25 and the second probe 26 offset each other along the moving direction of the movable fixture 24. The object A and the standard object B are disposed on a same side of the horizontal platform 22. The object A corresponds to the first probe 25 and the standard object B corresponds to the second probe 26.

Figure 8:
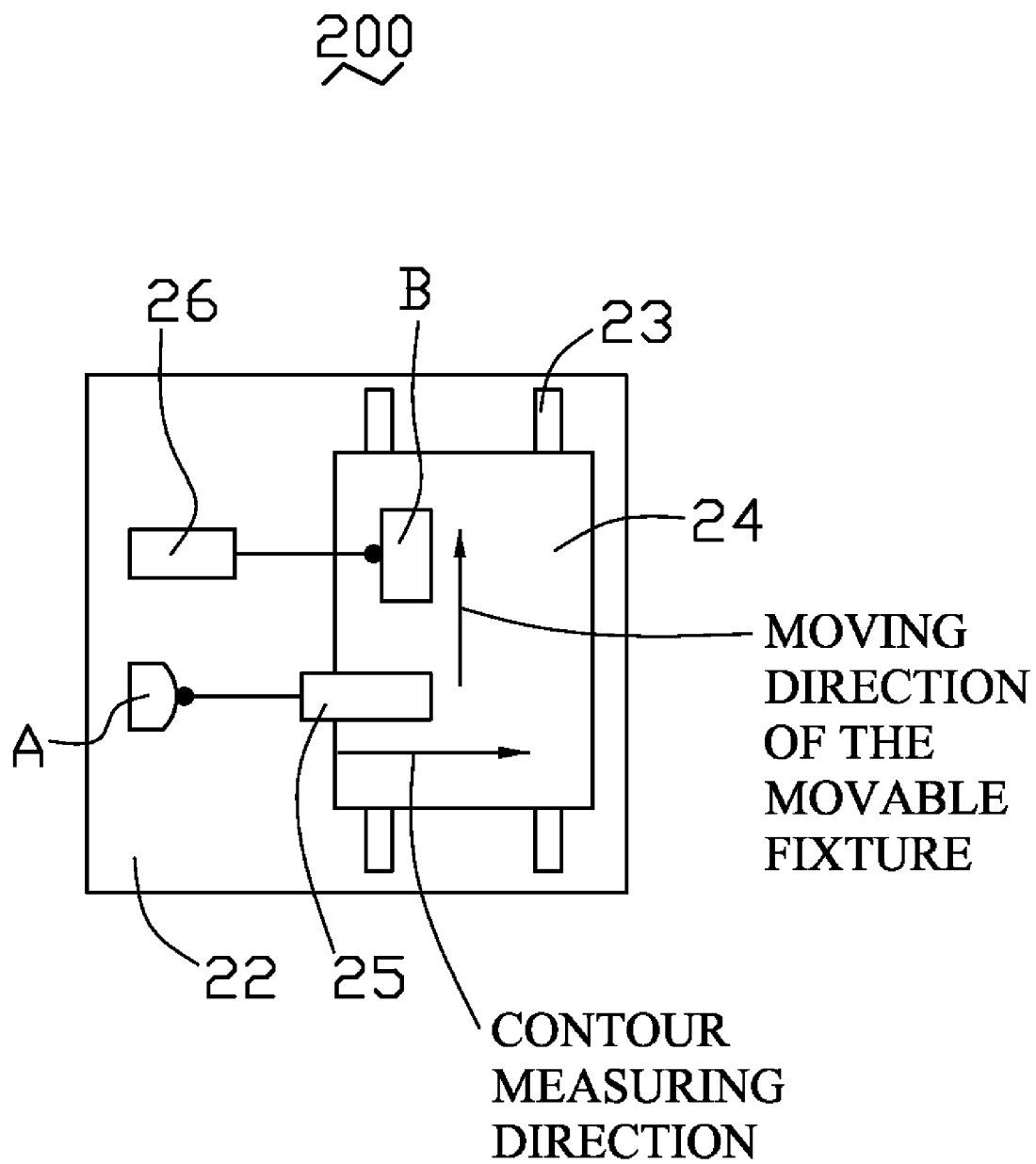
FIG. 8 is a schematic, top plan view of a contour measuring device in a second state according to the second embodiment of the present invention.

Referring to FIG. 8, in a second state of the second embodiment, the first probe 25 and the second probe 26 are disposed on the horizontal platform 22 and are aligned parallel to each other. The first probe 25 and the second probe 26 offset each other along the moving direction of the movable fixture 24. The object A and the standard object B are disposed on a same side of the movable fixture 24. The object A corresponds to the first probe 25 and the standard object B corresponds to the second probe 26.

Figure 9:
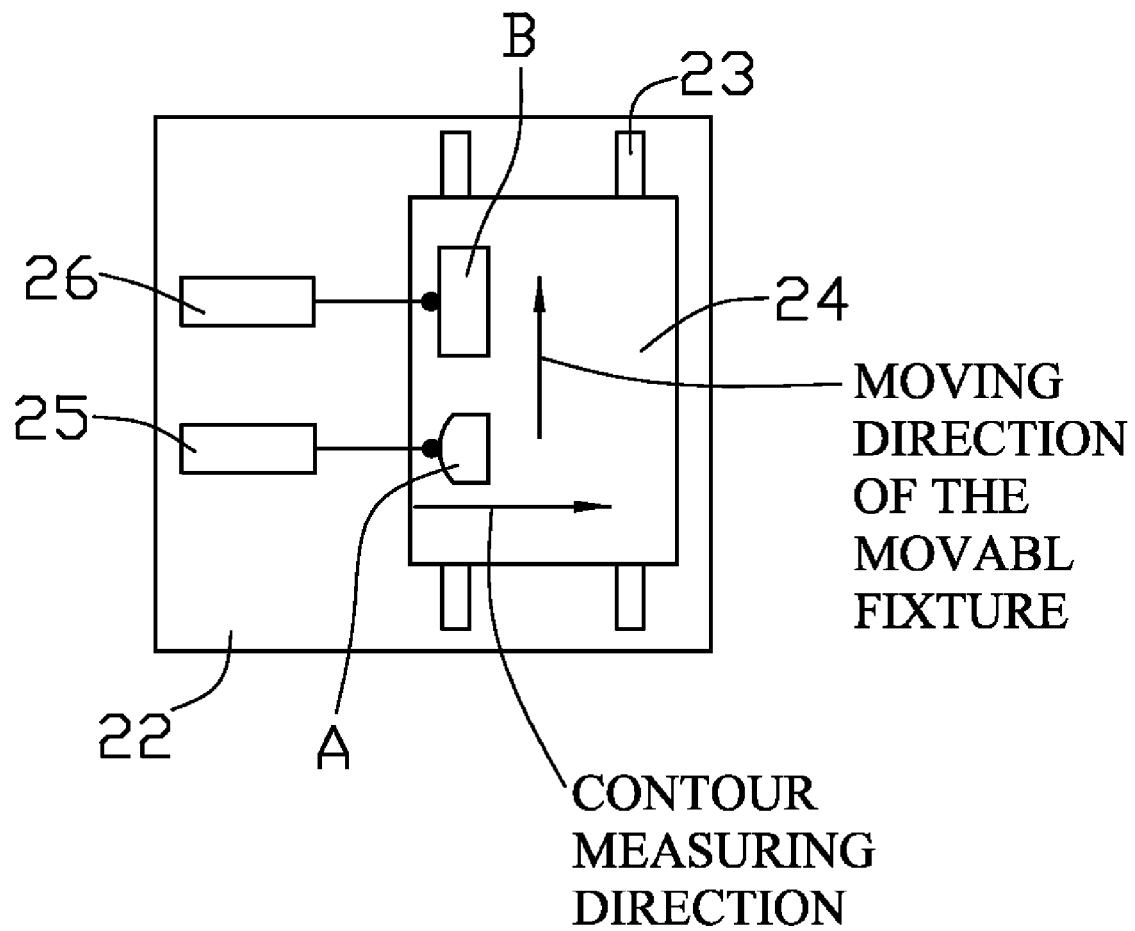
FIG. 9 is a schematic, top plan view of a contour measuring device in a third state according to the second embodiment of the present invention.

Referring to FIG. 9, in a third state of the second embodiment, the first probe 25 and the standard object B are disposed on the movable fixture 24 and are aligned parallel to each other. The first probe 25 and the standard object B offset each other along the moving direction of the movable fixture 24. The object A and the second probe 26 are disposed on a same side of the horizontal platform 22. The object A corresponds to the first probe 25 and the standard object B corresponds to the second probe 26.

Figure 10:
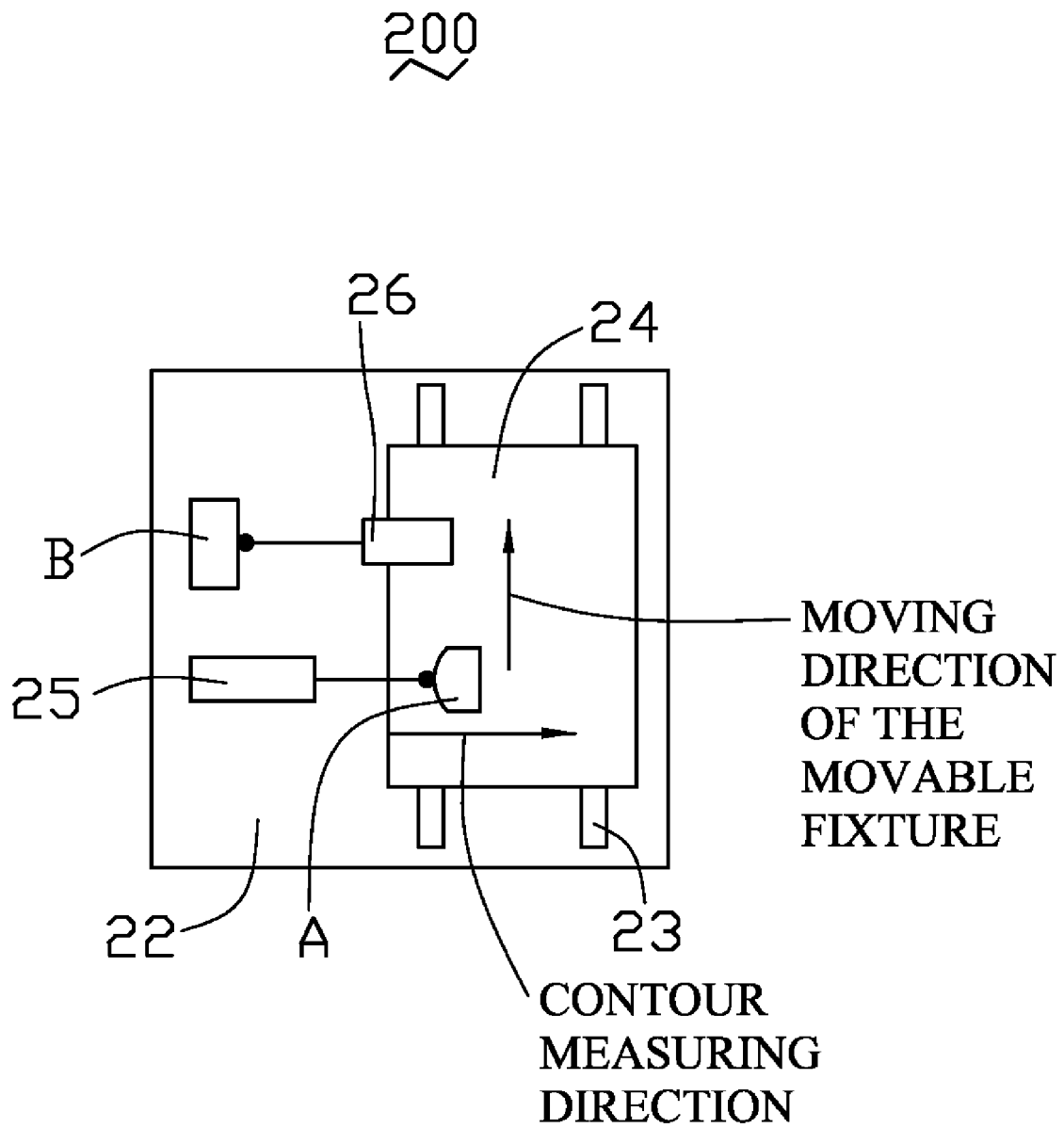
FIG. 10 is a schematic, top plan view of a contour measuring device fourth state according to the second embodiment of the present invention.

Referring to FIG. 10, in a fourth state of the second embodiment, the object A and the second probe 26 are disposed on the movable fixture 24 and are aligned parallel to each other. The object A and the second probe 26 offset each other along the moving direction of the movable fixture 24. The first probe 25 and the standard object B are disposed on a same side of the horizontal platform 22. The object A corresponds to the first probe 25 and the standard object B corresponds to the second probe 26.

In use, the contour measuring device 200 is also similar in principle to the contour measuring device 100 described above. A contact tip 213 of the first probe 25 is in contact with the contour of the object A and the contact tip 213 of the second probe 26 is in contact with the reference contour of the standard object B. When the movable fixture 24 is driven to move, the first probe 25 can measure the object A and obtain a first measured contour value 50, and the second probe 15 can measure the standard object B and obtain a second measured contour value 60.

The first measured contour value 50 may include contour errors of the object A, that is, linear errors of the guide rails 23, and motion errors of the movable fixture 24. The second measured contour value 60, of the standard object B, will also reproduce the same contour errors of object A, that is, linear errors of the guide rails 23, and motion errors of the movable fixture 24. The contour measuring device 200 includes a pick-up head (not shown) for reading the first measured contour value 50 and the second measured contour value 60, and a the pick-up head transmits them to an error correcting unit (not shown) of the contour measuring device 200. The error correcting unit processes the first measured contour value 50 and the second measured contour value 60 by the following steps. In a first step, because a value of the contour errors of the standard object B is a known quantity, thus if the contour errors of the standard object B are free from the second measured contour value 60, the linear errors of the guide rails 23 and the motion errors of the movable fixture 24 are obtained. In a second step, the linear errors of the guide rails 23 and the motion errors of the movable fixture 24 are added or subtracted from the first measured contour value 50.

When the linear errors of the guide rails 23 and the motion errors of the movable fixture 24 are subtracted from the first measured contour value 50, a compensated contour value 70 of the object A is obtained. Therefore, the compensated contour value 70 is almost free from the linear errors of the guide rails 23 and the motion errors of the movable fixture 24, and is almost equal to contour errors of the object A. The compensated contour value 70 is transmitted to a memory chip (not shown) by a processor (not shown). Since the above two steps are realized in the processor, a memory chip (not shown) can register the compensated contour value 70 output by the processor one by one in real time.

In alternative embodiments, the first probes 15, 25 and the second probes 16, 26 are different from each other, for example the first probes 15, 25 can be touch trigger probes, and the second probes 16, 26 can be contactless probe, for example, optical probes. Similarly, the first probes 15, 25 can also be optical probes, and the second probes 16, 26 are touch trigger probes. The contactless probe such as optical probe can emit light to the objects and the light is focused on the objects for obtaining measured contour value of the object to be measured by optical scanning.

Figure 11:
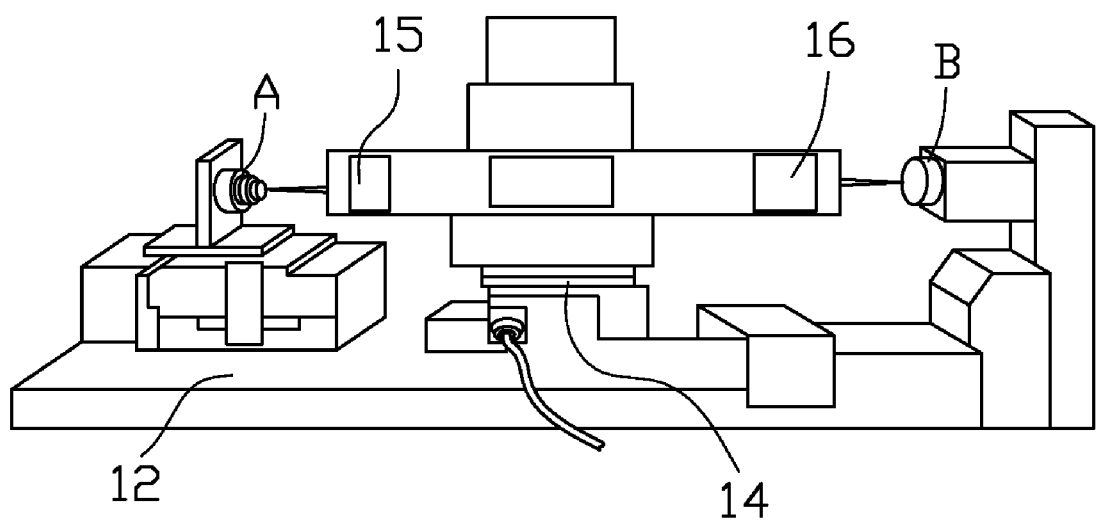
FIG. 11 is a isometric view of the contour measuring device of FIG. 1 used to measure dimensions of a precision optical lens.

In manufacturing precision components such as optical lenses, the optical lenses generally need to be machined again if they do not fall within specified tolerances of contour and dimension. Referring to FIG. 11, the contour measuring device 100 is applied in the manufacturing optical lenses. The first probe 15 is configured for measuring the lens A, and the second probe 16 is configured for measuring the standard object B.

Figure 12:
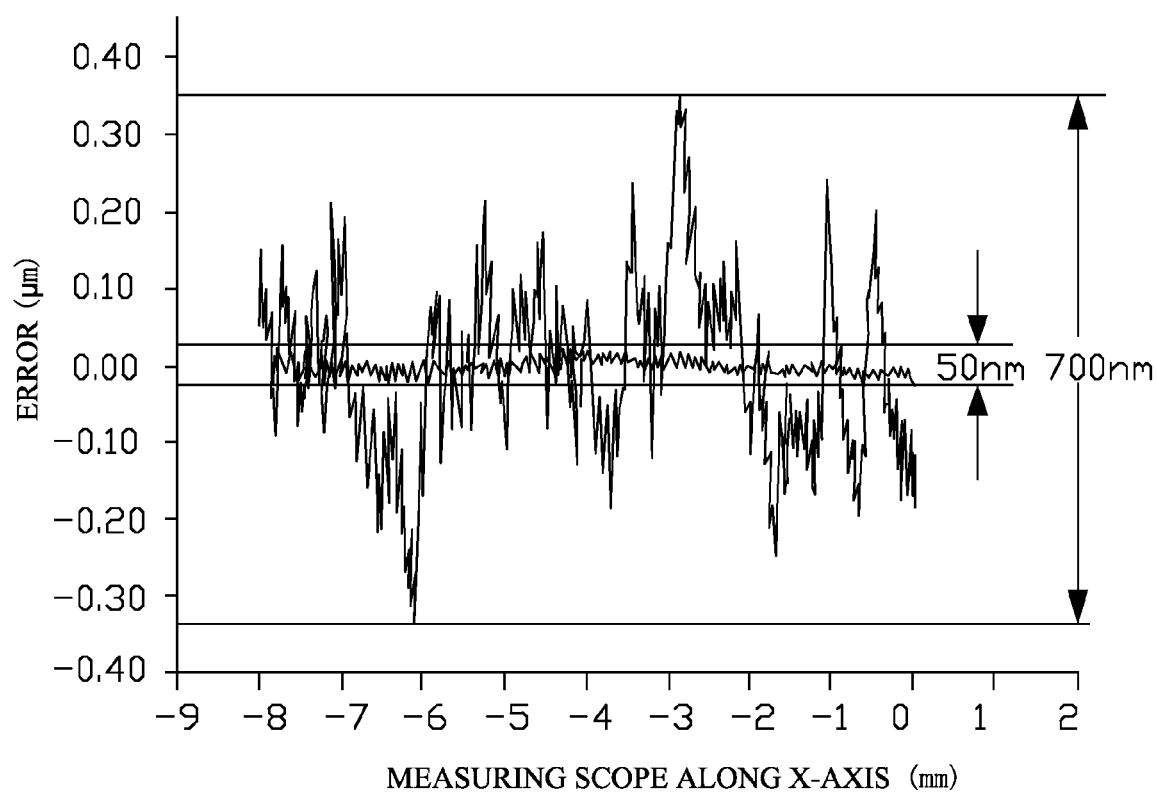
FIG. 12 is a graph of the linear errors of guide rails of the contour measuring device shown in FIG. 11.
Figure 13:
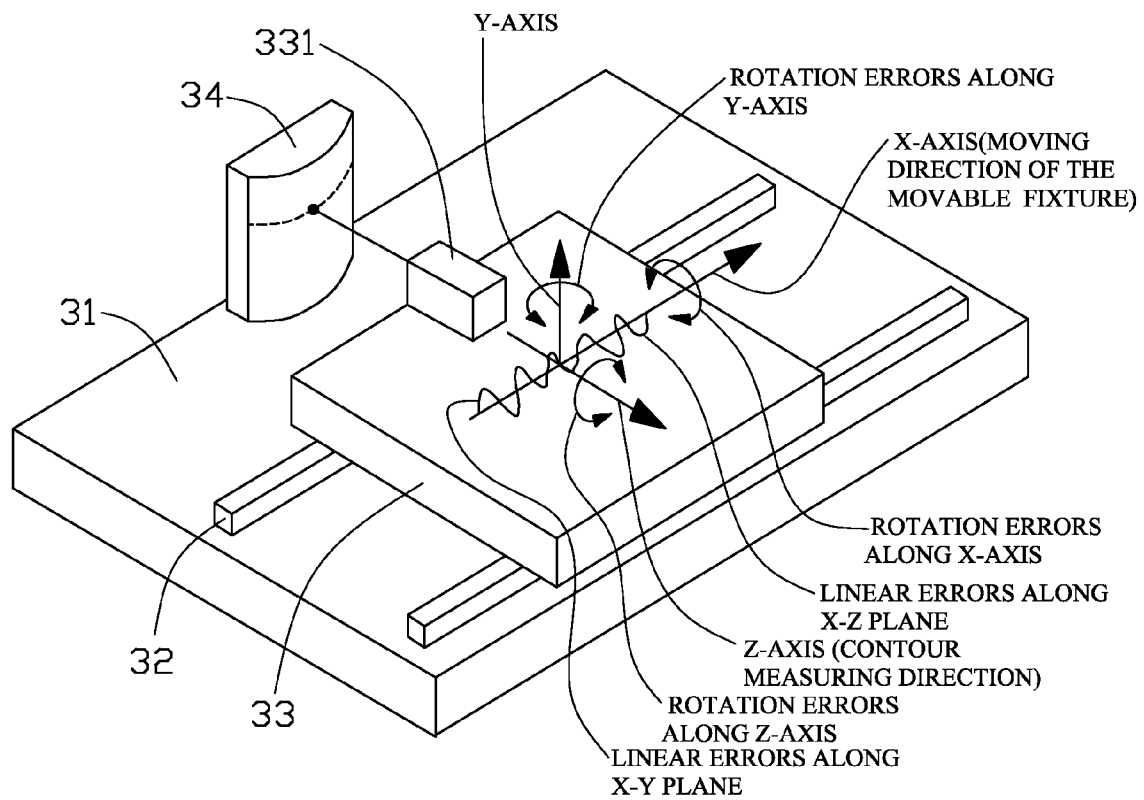
FIG. 13 is a schematic, isometric view of a conventional contour measuring device.

Referring to FIG. 12, a schematic graph shows the compensated linear errors of guide rails of the contour measuring device. It can be seen that most of the linear errors of guide rails are in the range of 50 nano-meter (nm), compared with the range of 700 nm in the typical contour measuring device. Thus the errors of the guide rails affecting contour measurements are greatly decreased. Therefore, the present contour measuring device can automatically compensates for errors in the measurement of contours and provides highly accurate measurements.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring device, comprising:
 a pair of guide rails;
 a movable fixture movably disposed on the guide rails;
 a first probe for measuring an object along a contour measuring direction and obtaining a first measured contour value from the object to be measured;
 a second probe for measuring a standard object whose contour is known along the contour measuring direction and obtaining a second measured contour value from the standard object; and an error correcting unit for compensating the first measured contour value according to the second measured contour value.

2. The contour measuring device as claimed in claim 1, wherein the first probe and the second probe are coaxially aligned along the contour measuring direction.

3. The contour measuring device as claimed in claim 1, wherein the first probe and the second probe are aligned parallel to each other along the contour measuring direction.

4. The contour measuring device as claimed in claim 3, wherein the first probe is disposed on the horizontal platform, and the second probe is disposed on movable fixture.

5. The contour measuring device as claimed in claim 3, wherein the first probe is disposed on the movable fixture, and the second probe is disposed on the horizontal platform.

6. The contour measuring device as claimed in claim 1, wherein the first probe and the second probe are touch trigger probes.

7. The contour measuring device as claimed in claim 1, wherein the first probe and the second probe are optical probes.

8. The contour measuring device as claimed in claim 1, wherein the first probe is a touch trigger probe and the second probe is an optical probe.

9. The contour measuring device as claimed in claim 1, wherein the first probe is an optical probe and the second probe is a touch trigger probe.

10. The contour measuring device as claimed in claim 1, wherein the contour measuring device further includes a horizontal platform, the guide rails are fixed on the horizontal platform, spaced apart and parallel to each other.

11. The contour measuring device as claimed in claim 1, wherein each of the first and second probe includes a mounting base, a block guide rail, a shaft disposed on the block guide rail, a contact tip, a measuring scale configured for measuring displacements of the contact tip, a displacement sensor, and a pick-up head, the contact tip is disposed at one end of the shaft and the measuring scale is disposed at opposite end of the shaft, and the displacement sensor is disposed on the mounting base, the displacement sensor is configured for detecting the displacements measured by the measuring scale and obtaining measured contour value, the pick-up head is configured for reading the measured contour value from the displacement sensor.

12. The contour measuring device as claimed in claim 11, wherein the error correcting unit is disposed on or adjacent to the horizontal platform, the error correcting unit includes a processor and a memory chip, the memory chip is connected to an output port of the processor, the processor is connected to the first probe and the second probe for receiving and compensating for the measured contour value, and the memory chip is configured for registering the compensated contour value output by the processor.

13. The contour measuring device as claimed in claim 1, wherein the first probe and the second probe are disposed on the movable fixture, and the first probe and the second probe are coaxially aligned along the contour measuring direction.

14. The contour measuring device as claimed in claim 1, wherein the first probe and the second probe are disposed on the horizontal platform, and the first probe and the second probe are coaxially aligned along the contour measuring direction.

* * * * *